United States Patent
Krause et al.

Patent Number: 6,153,235
Date of Patent: *Nov. 28, 2000

[54] MILK-COATED CEREAL PRODUCT

[76] Inventors: Arthur A. Krause, 20539 Archwood St., Winnetka, Calif. 91306; Walter K. Lim, 14720 Horticultural Dr., Hacienda Heights, Calif. 91745

[*] Notice: This patent is subject to a terminal disclaimer.

[21] Appl. No.: 09/098,962

[22] Filed: Jun. 18, 1998

Related U.S. Application Data

[60] Provisional application No. 60/078,181, Mar. 16, 1998.

[51] Int. Cl.⁷ .................... A21D 13/00; A23L 1/216
[52] U.S. Cl. .................... 426/94; 426/96; 426/619; 426/620; 426/621
[58] Field of Search .................... 426/94, 619, 620, 426/621, 96

[56] References Cited

U.S. PATENT DOCUMENTS

| | | | |
|---|---|---|---|
| 3,494,769 | 2/1970 | Tressler | 99/83 |
| 3,578,459 | 5/1971 | Corbin | 99/1 |
| 3,582,336 | 6/1971 | Rasmusson | 426/94 |
| 3,992,556 | 11/1976 | Kovacs et al. | 426/72 |
| 4,089,984 | 5/1978 | Gilbertson | 426/293 |
| 4,485,120 | 11/1984 | Gantwerker et al. | 426/625 |
| 4,585,664 | 4/1986 | Kohlwey | 426/619 |
| 4,755,390 | 7/1988 | Calandro et al. | 426/293 |
| 4,874,624 | 10/1989 | Conroy et al. | 426/457 |
| 5,027,980 | 7/1991 | Bell | 222/94 |
| 5,035,914 | 7/1991 | Doerr | 426/621 |
| 5,827,564 | 10/1998 | Bodkin, Sr. | 426/620 |
| 5,894,027 | 4/1999 | Kazemzadeh | 426/94 |

OTHER PUBLICATIONS

Scott Hegenbart; Mastering the Morning: Creating Breakfast Cereals; Jul. 1995; pp. 27–28, 32, 36, 39, 42, 45–46, 50–51; Food Product Design Magazine.

Elaine Knehr; Bowl 'em Over: Adding Value to Breakfast Cereal; Jun. 1997; pp. 103, 105, 109–110, 113–115–119; Food Product Design Magazine.

Kimberlee J. Burrington; More Than Just Milk; Jan. 1998; pp. 91–92, 95–96, 100, 105–106, 109–111; Food Product Design Magazine.

Lynn A. Kuntz; Building A Better Breakfast Cereal; Apr. 1998; pp. 34–36, 39, 41, 43, 45–46, 49–60; Food Product Design Magazine.

Kraft Promotional Brochure; Kraft Non–Fat Dry Milk Alternates, Kraft Food Ingredients.

*Primary Examiner*—Nina Bhat
*Attorney, Agent, or Firm*—Dennis H. Lambert

[57] ABSTRACT

A dry, ready-to-eat cereal product in which pieces of cereal are coated with a dry powdered milk or milk substitute product that is reconstitutable in hot or cold water to produce a cereal having flavor, appearance and nutritional value comparable to an equivalent cereal that is not coated with the dried milk or milk substitute product but to which liquid milk has been added.

15 Claims, 3 Drawing Sheets

MILK-COATED CEREAL PRODUCT

CROSS-REFERENCE TO RELATED APPLICATIONS

This application claims the benefit of U.S. Provisional Application Ser. No. 60/078,181, filed Mar. 16, 1998.

BACKGROUND OF THE INVENTION

1. Field of the Invention

This invention relates to ready-to-eat food products. More particularly, the invention relates to a cereal product coated with dry powdered milk or milk substitute that is reconstituted by the addition of water.

2. Description of the Prior Art

Food products that require little or no preparation have been available to the consumer for many years. These food products include breakfast cereals that are pre-sweetened and/or pre-flavored, whereby it is necessary only to add milk or hot water, depending upon the type of cereal and the desired flavor, to prepare the cereal for normal consumption. Some breakfast cereals are intended to be eaten hot, and these must either be cooked or have hot water or hot milk added to them.

Many consumers eat breakfast cereals as a snack food, with or without the addition of milk. As reported in a recent issue of Business Week magazine, there is a growing trend to consume cereal at noon and at night, as well as more traditionally as a breakfast food. Many breakfast cereals may be eaten directly from the box, without any preparation time, except for the addition of milk or hot water, if desired, thus making it extraordinarily convenient for the frenetic pace of today's consumer. Further, the average consumer is more health conscious than in the past, and breakfast cereals make a more healthy ready-to-eat snack than many other ready-to-eat snack foods. Pre-sweetened and pre-flavored breakfast cereals also make them more convenient for consumption straight out of the box, since it is not necessary to add sweeteners or flavorings to the cereal before eating it.

The convenience and nutritional value of cereal make it especially desirable as a food product. This is especially true in countries where conditions limit the availability of many healthful foods, due at least in part to the lack of refrigeration. Ready-to-eat cereals can be stored without refrigeration, and especially if fortified with vitamins and minerals, could provide essential nutrition to large segments of the population in these countries. For instance, milk and other dairy products are an important source of calcium, but the absence of refrigeration makes it very difficult to provide milk as a part of the regular diet in these countries.

U.S. Pat. No. 3,494,769 describes a breakfast cereal suitable for use as cold cereal by the addition of milk, or as a hot cereal by the addition of hot water. The cereal is prepared by heating rolled oats to cook the starch and protein contained therein, applying liquid milk in sufficient quantity only to wet the oats and to distribute it evenly throughout the oat product, and then drying the wet product to crispness, producing a crunchy product. During the manufacturing process, the flaky or granular cereal is either sprayed or sprinkled with liquid milk in which sugar, salt, fruit juice puree, and/or flavoring materials are dissolved, whereby the mixture is absorbed by the oat flakes and evenly distributed throughout the body of the flakes. Cream, butterfat, or cream substitute may be added to the milk to improve the flavor and the texture of the product. The cream or dry cream substitute may be mixed with the milk or it may be added to the cereal in a conventional mixer after the milk containing the other additives has been added. If a dry cream substitute is used, it may be dusted onto the cereal while the mixer is operating. The amount of milk added to the cereal is determined by the desired crunchiness of the resulting product, i.e., if a relatively small amount of milk is used and little fruit is added, the product will be relatively soft and water absorptive and not crunchy, or if a higher proportion of milk with fruit is used to wet the cereal, which is thereafter dried, it is crunchy. There is no suggestion in this patent of adding dry, powdered whole milk or low fat milk as a coating dusted onto prepared cereal pieces so that the addition of water to the cereal reconstitutes the milk to produce a cereal product that has the taste and appearance of an uncoated cereal prepared conventionally by the addition of liquid milk.

An example of a pre-sweetened breakfast cereal is described in U.S. Pat. No. 4,089,984. This patent purports to overcome the difficulty in the prior art of sweetening cereals with fructose sweeteners. The use of fructose sweeteners, which are normally in a liquid state, was not practical before the invention described in this patent, since such coating resulted in a sticky, messy product. The teaching in this patent overcomes this difficulty and enables liquid fructose sweeteners to be used on cereal products, by covering or coating the sticky fructose coating with an edible powdered material to eliminate the stickiness. Examples of the powdered material are given as sucrose, lactose, dried corn syrup solids, corn starch, wheat starch, dried milk solids and/or dextrose. In the process described in this patent, the liquid sweetener is treated to evaporate a majority of the moisture from the liquid sweetener and then it is applied to the cereal pieces by using an enrober drum while the liquid sweetener is still at an elevated temperature and thus fluid. A limited amount of the powdered material is dusted onto the coated cereal pieces as cooling takes place. The liquid sweetener captures the powdered material, and the powdered material substantially eliminates the cohesiveness and stickiness of the coated pieces. There is no suggestion in this patent of adding dry, powdered whole milk or low fat milk as a coating dusted onto prepared cereal pieces so that the addition of water to the cereal immediately reconstitutes the milk to produce a cereal product that has the taste and appearance of an uncoated cereal prepared conventionally by the addition of liquid milk. The sweetener in this patent would dissolve relatively slowly in relation to the rate of dissolution of the powdered milk coating in the present invention, i.e., the sweetener would need to dissolve first in order to release the captured dried milk.

A process for manufacturing a reconstitutable cereal is described in U.S. Pat. No. 4,874,624, in which water is added to pre-steamed flaked oatlets which are then blended together and fed to an extruder cooker to raise the temperature and pressure of the product. The exudate is cut into pellets which are formed into flakes on flaking rolls and dried to a moisture content of 7%. The flakes are blended with 25% by weight of the pre-steamed oatlets to form an instant water-reconstitutable cereal product. The product is therefore ready for eating without the need to be cooked, and may be prepared simply by the addition of hot water or milk. Additives such as trace nutrients, vitamins, wheat flour, bran, skimmed milk powder, whey powder, or other milk by-products, malt extract, honey, sweetening agents such as sugar or aspartame, sunflower seed, vegetable oil, salt or other flavoring agents may be added to the conditioned flakes. The prepared oatlets are described as having all the normal organoleptic properties of oats which are cooked in the traditional manner, and the major advantage is described as a cereal product which may be instantly reconstituted simply by the addition of hot water or milk. There is no suggestion in this patent of adding dry, powdered whole milk as a coating dusted onto prepared cereal pieces so that the addition of water to the cereal reconstitutes the milk to produce a cereal product that has the taste and other attributes of an uncoated cereal prepared conventionally by the addition of liquid milk.

A creamy orange flavored snack cereal is described in U.S. Pat. No. 5,035,914. The food product described in this patent includes a popped cereal that includes a powdered dairy or dairy substitute product which simulates cream flavor, in combination with powdered orange or artificial orange flavor. The purpose of this patent is to provide a product which may be eaten as a snack without milk or liquid and yet has a "creamsicle" flavor. The patent describes two essential ingredients as being required in order to produce the invention. These are the constituent which creates the simulated cream flavor, and the constituent which creates the orange flavor. The cream flavor or creamy ice cream flavor is obtained by using powdered non-dairy cream substitutes such as, for example, coffee creamer or cream flavoring. The patent states that the food product may be eaten with milk, or used as a dry snack eaten like potato chips or other dry snacks. There is no suggestion in this patent of adding dry, powdered whole milk or low fat milk as a coating dusted onto prepared cereal pieces so that the addition of water to the cereal reconstitutes the milk to produce a cereal product that has the taste and appearance of an uncoated cereal prepared conventionally by the addition of liquid milk.

Other ready-to-eat or easily prepared food products are disclosed in U.S. Pat. Nos. 3,578,459, 3,992,556, 4,485,120, 4,585,664 and 4,755,390. These patents all relate to the use of various additives and/or manufacturing processes which enhance the nutritional value and/or quality, e.g., texture, flavor, etc., of the resultant product. For instance, U.S. porridge mix that is reconstitutable in milk, or which may be reconstitutable in water with the addition of dry milk solids. The non-fat dry milk solids are added to provide an amount of milk solids equivalent to the milk solids obtained in a conventional long-cook product, i.e., to provide an excess of milk solids in the rehydrated final ready-to-eat product. The conventional long-cook process evaporates water from the milk in which the rice is cooking and this results in an excess of milk solids, as compared to uncooked milk. Synthetic milk-like substances such as sodium caseinate and/or non-milk lipid sources may be used instead of non-fat dry milk solids. There is no suggestion in this patent of adding dry, powdered whole milk or low fat milk as a coating dusted onto prepared cereal pieces so that the addition of water to the cereal reconstitutes the milk to produce a cereal product that has the taste and appearance of an uncoated cereal prepared conventionally by the addition of liquid milk.

Applicant is not aware of any prior art teaching of a dry, ready-to-eat cereal product coated with a dry milk product, such as powdered whole milk or a low-fat or non-fat dry milk product or dry powdered milk substitute, or any combination thereof, so that it is necessary only to add water to reconstitute the milk product, thereby producing a ready-to-eat cereal and milk combination that, in terms of taste, texture and appearance, is comparable to a conventional dry cereal product to which liquid milk has been added to prepare it to be eaten. Alternatively, the milk-coated dry cereal product of the invention may be eaten straight from the box, without the addition of water, and will have a flavor and nutritional value very much like that of cereal to which milk has been added. The prior art does not disclose anything comparable.

Thus, there is need for a cereal product that is coated with a dry milk product, such as powdered whole milk or low-fat or non-fat milk or milk substitute, or some combination thereof, that may be reconstituted by the addition of water, or eaten straight from the box, so that the nutritional benefit and flavor of a cereal and milk combination may be produced without the necessity of adding liquid milk to the cereal to prepare it to be eaten.

SUMMARY OF THE INVENTION

The present invention overcomes the deficiencies of the prior art by providing a dry cereal product coated with a dry, powdered milk product, including dried whole milk, low-fat dry milk, non-fat dry milk, or dry milk substitute product, or a combination of any of these, reconstitutable in water, whereby it is necessary only to add water to obtain a cereal product that is comparable in taste, nutrition and appearance to that obtained with conventional cereals by the addition of liquid milk.

The milk-coated cereal of the invention may be stored just as any other dry cereal product, making it particularly suitable for prolonged storage under non-refrigerated conditions. The dry milk-coated cereal of the invention is thus convenient for school, office and home use, and may be dispensed in vending machines. Since water is generally available even when milk is not, the milk-coated cereal of the invention could be distributed in third world countries to provide a flavorful food having the nutritional benefits of cereal and milk, without the need for preserving and storing regular milk products. It is also particularly well adapted for use on camping trips or by the military or in disaster relief, etc.

Further, the ready-to-eat milk-coated cereal of the invention may be packaged in serving size boxes, with or without the inclusion of a plastic spoon, so that it is necessary only to have access to water in order to produce a cereal immersed in milk, without requiring storage and access to regular milk, or eating utensils.

The powdered milk coating may be applied to the cereal pieces either while the cereal pieces are still wet or damp during the manufacturing process, or after the cereal pieces have been dried. Conventional equipment may be used to dust the cereal pieces with the powdered milk product. Alternatively, dried cereal prices may be lightly misted or wetted with water, sweetener, flavoring, etc. and the dry powdered milk product then dusted onto the cereal pieces, after which the coated cereal pieces are dried and packaged.

To enhance adherence of the dry milk product to the cereal pieces, the milk product may be processed to have the consistency of flour. This fine, dust-like texture of the coating is not as easily dislodged from the cereal pieces as would be a coarser material.

As a further alternative, the powdered milk product can be made slightly damp so that it will adhere to the dry cereal pieces, and then sprayed onto the dried cereal pieces as they fall or are tumbled through the coating spray. The thus-coated cereal pieces can then be dried and packaged.

The dry milk coating of the invention may be used as a carrier for other nutrients, to fortify the cereal with vitamins and minerals. Further, various products such as acidolpholis or Lactaid may be substituted for milk (dairy) products to produce a cereal that can be eaten by persons who are lactose-intolerant.

A milk substitute such as whey or soy, for example, can be mixed with skim milk or non-fat dry milk product to minimize the cost but still obtain a desireable flavor.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF A PREFERRED EMBODIMENT

Figure 1:
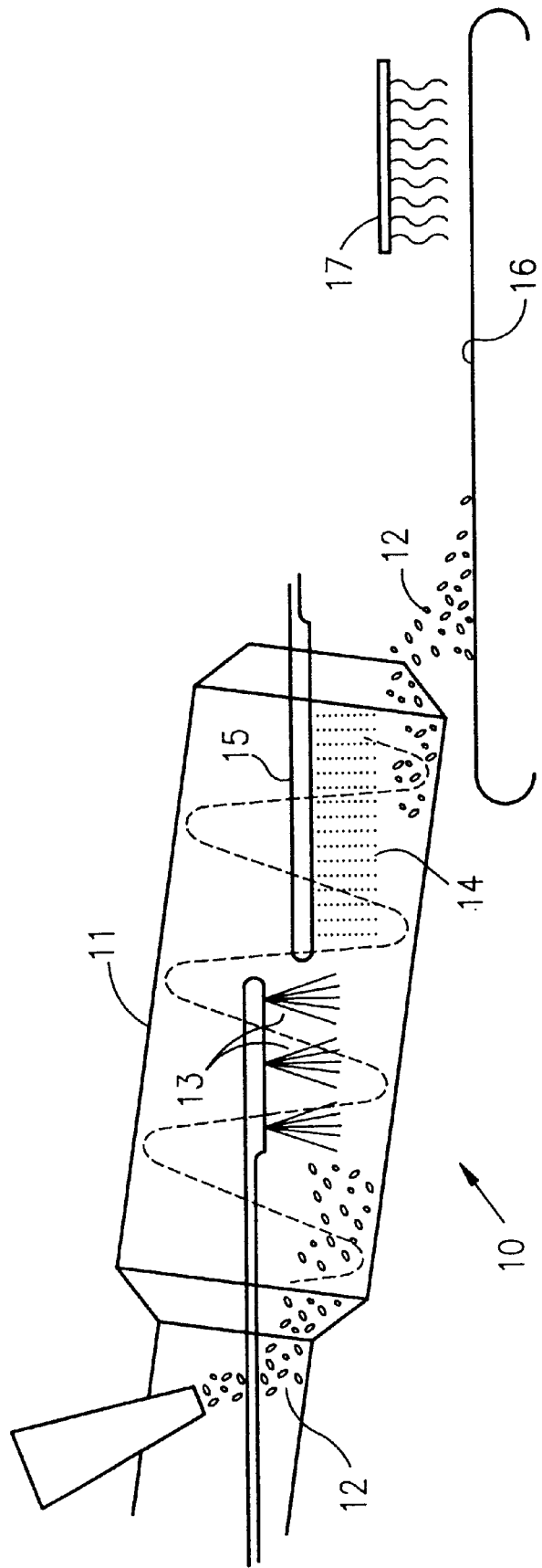
FIG. 1 is a schematic longitudinal sectional view of a system that may be utilized to coat the cereal pieces with the dry powdered milk product according to the invention.

In accordance with the present invention, conventional cereal pieces are coated with a powdered whole milk or a low-fat or non-fat dry milk or a dry milk substitute product, or a combination of these, that is reconstitutable in water. The dry powdered milk may be dusted onto the cereal pieces at the end of the cereal manufacturing process, either while the cereal pieces are still wet or damp, or after the cereal pieces have been dried. A tacky substance or wetting agent can be applied to dry cereal pieces to facilitate adherence of the dry milk or milk substitute to the cereal pieces.

Coating of the dry powdered milk product onto the cereal pieces can be accomplished in any suitable manner, as by spraying, dusting, tumbling, etc.

The powdered milk coating preferably comprises dried whole milk or a low-fat dry milk or dry milk substitute product, but dried skim milk or non-fat milk products can be used, although they do not produce the same flavor or appearance as cereal coated with dried whole milk or low fat milk. However, milk substitutes such as whey or soy can be added to the non-fat milk products to enhance their flavor and appearance. This enables the cost of the coating to be minimized while still obtaining a satisfactory flavor. Similarly, coffee creamers and similar products should not be used since they do not readily dissolve in cold water. They also do not provide the same flavor as dried whole milk.

A suitable powdered milk coating may be obtained from the low fat dry milk product that is sold by Familiar Foods, Inc., of City of Industry, California, under the trademark MILKMAN®. This product contains 5% milk fat before adding water, and ½% milk fat after water is added. It also contains a small amount of cream for added flavor.

Commercially available dried milk products, including that noted above, are generally granular to avoid lumping and to obtain rapid dissolution when added to water. For use in the present invention, these products may be further processed to a flour-like consistency, which results in better adherence between the coating and the cereal pieces, but which also readily dissolves in water, without lumping, because the powder is in a layer distributed over the surface of the cereal pieces.

The powdered milk coating may be applied to pre-sweetened cereals as well as to unsweetened cereals. If applied to pre-sweetened cereals, the sweetener should be applied first, so that the powdered milk coating is quickly dissolved to reconstitute the milk when water is added to the cereal. It is thus possible to dust or spray the powdered milk coating onto the pre-sweetened cereal while the sweetener is still tacky, thereby insuring adequate adhesion between the powdered milk and the cereal pieces. However, it is also possible to dust the powdered milk onto the cereal pieces after the cereal has been dried.

Instead of powdered milk, coarser consistencies can be used. For example, dry milk pellets could be used with some cereals, such as shredded wheat, if desired, because this cereal captures the pellets in the interstices of the cereal structure.

Best results are obtained when the dried milk or milk substitute is added in the ratio of from about six percent up to about thirty-two percent (6%–32%), by weight, of the cereal being coated, although other amounts may be acceptable on some cereals, depending upon the structure and flavoring of the cereals.

If a milk substitute such as whey or soy is added to dry skim milk or nonfat milk products to enhance their flavor and appearance, the ratio of substitute to non-fat milk is preferably in the range of 15% to 25%, by wieght.

Additional nutrients can be mixed in the dried milk or milk substitute, which then serves as a carrier, and dusted or coated onto the cereal pieces at the same time that the milk or milk substitute is applied to the cereal. Sweeteners and flavorings can be similarly applied. By applying the nutrients, sweeteners and/or flavorings at the end of the manufacturing process, many of the problems associated with loss of nutrients and detrimental change to flavorings caused by heat or other processing steps can be avoided.

A process by which cereal may be coated in accordance with the invention is shown schematically in FIG. 1. In this figure, an apparatus for coating the cereal is indicated generally at 10. The apparatus includes an elongate chamber 11 through which the cereal 12 is conveyed while being tumbled. A plurality of nozzles 13 are positioned in the chamber 11 for spraying a mist onto the cereal to dampen it. Powdered milk or milk substitute 14 is then dusted onto the cereal pieces from a discharge member 15 positioned in the chamber 11 downstream from the nozzles 13, so that the cereal is substantially uniformly coated on all surfaces as it passes through the chamber 11. The cereal is thereafter conveyed by conveyor 16 through a heater 17 where it is dried prior to being packaged.

If desired, rather than wet the cereal pieces, the powdered milk may be in a slightly wet state so that it will adhere to the pieces of cereal, with or without first wetting the cereal.

The coated cereal then passes through a chamber 14 where the cereal is heated to dry the milk coating on the pieces of cereal.

Figure 2:
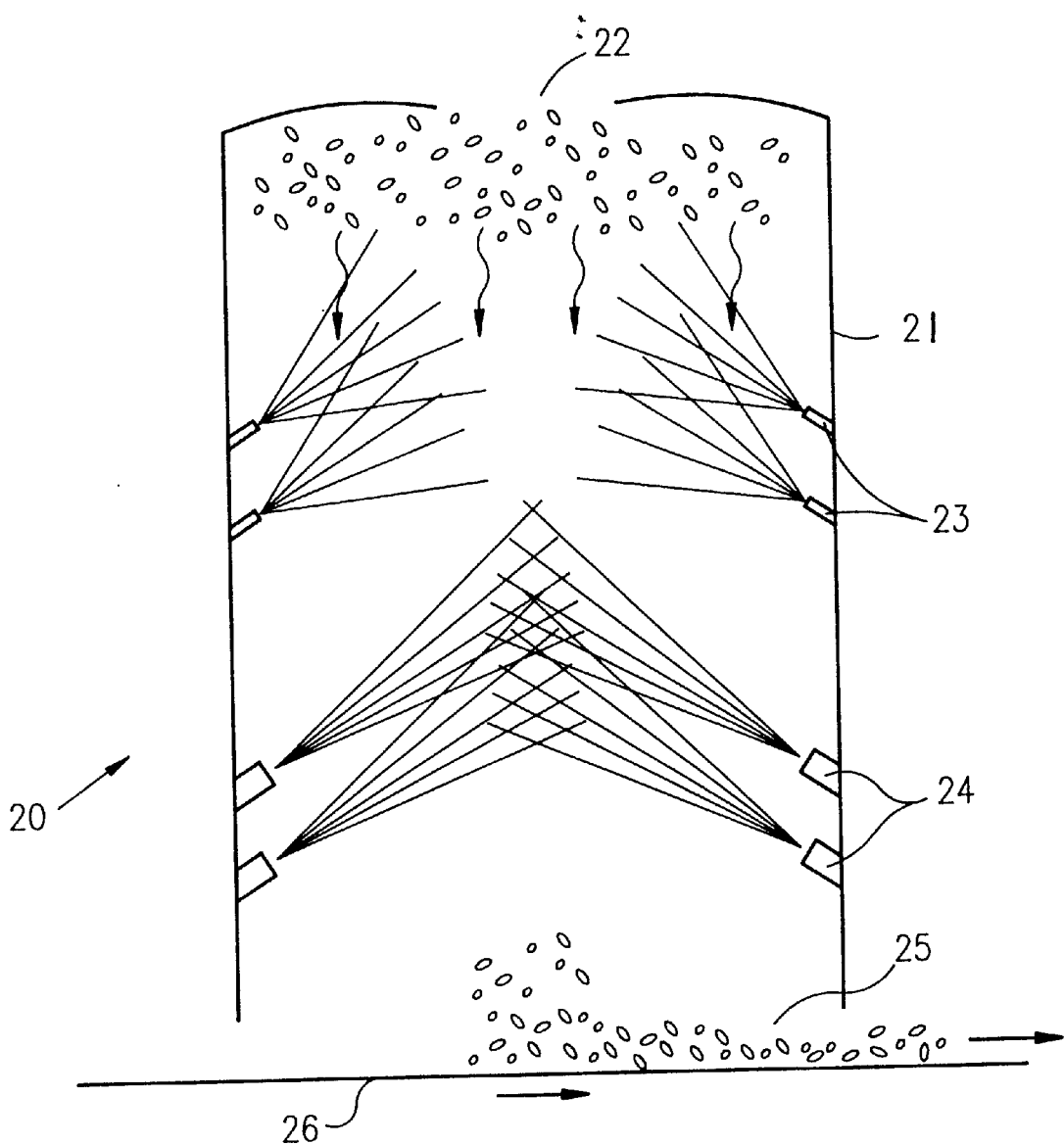
FIG. 2 is a schematic longitudinal sectional view of an alternate system that may be used to produce the coated cereal of the invention.

An alternate process by which cereal may be coated in accordance with the invention is shown schematically in FIG. 2. In this figure, an apparatus for coating the cereal is indicated generally at 20. The apparatus includes an elongate, vertically oriented chamber 21 through which the cereal 22 falls under the influence of gravity. A plurality of uniformly distributed nozzles 23 are positioned around the chamber 21 for spraying powdered milk product into the path of the falling cereal so that the cereal is coated as it passes through the sprays of powdered milk. If desired, the powdered milk may be in a slightly wet state so that it will adhere to the pieces of cereal, or the cereal may be dampened prior to applying the powdered coating.

The coated cereal then falls through streams of heated air blown into the path of the falling cereal through nozzles 24 to dry the milk coating on the pieces of cereal. The velocity of air introduced through the upturned nozzles may be controlled as desired to avoid excessive agitation of the cereal, and even to achieve some control over flow of the cereal pieces downwardly through the chamber.

The coated cereal 25 then falls onto a conveyor 26 for conveyance to a suitable packaging station. This alternate system for coating the cereal pieces eliminates the jarring of the cereal pieces, and the potential dislodgement of the coating associated with such jarring, caused by impact of the cereal pieces against the structure of the apparatus shown in FIG. 1, as the cereal progresses through it.

Figure 3:
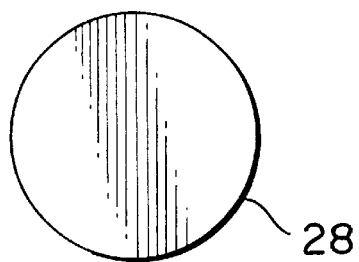
FIG. 3 is a top plan view of a circular container for packaging individual serving sizes of the cereal according to the invention.
Figure 4:
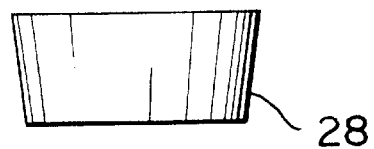
FIG. 4 is a side view in elevation of the container of FIG. 3.
Figure 5:
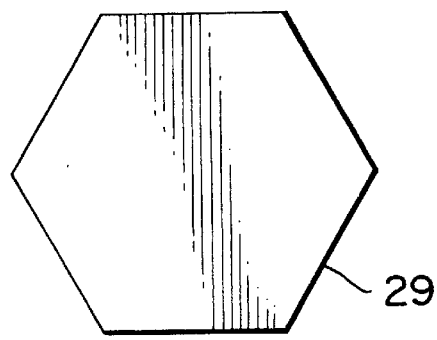
FIG. 5 is a top plan view of a hexagonally shaped container for packaging the cereal according to the invention in individual serving sizes.
Figure 6:
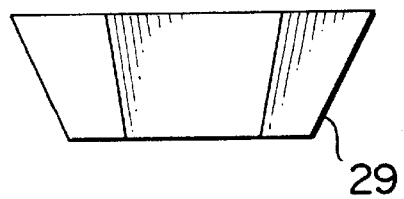
FIG. 6 is a side view in elevation of the package of FIG. 5.
Figure 7:
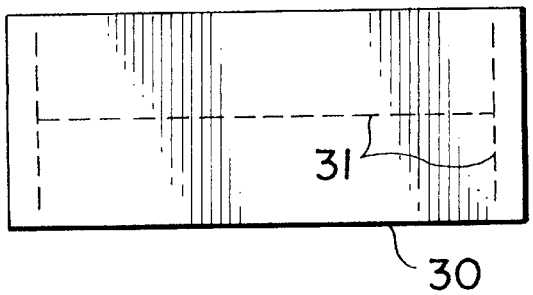
FIG. 7 is a top plan view of a rectangularly shaped container for packaging individual serving sizes of the cereal according to the invention.
Figure 8:
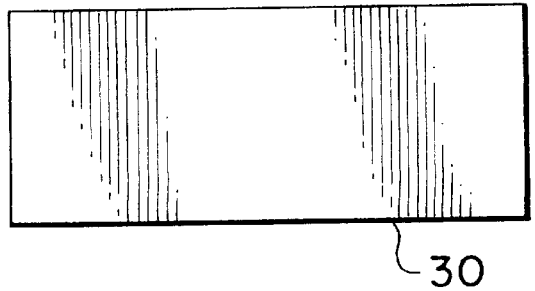
FIG. 8 is a side view in elevation of the package of FIG. 7.

A variety of different shaped containers are shown in FIGS. 3–8 for packaging the cereal in individual serving sizes. FIGS. 3 and 4 show a circular container 28 having slightly tapered side walls. FIGS. 5 and 6 show a hexagonally shaped container 29, having more sharply sloping side walls. FIGS. 7 and 8 show a rectangular shaped container 30 which may have perforations 31 formed in its top wall to facilitate opening of the wall. In this form of the invention, as well as in the previously described forms, the package may be suitably treated to make it water tight, and after it is opened water and/or milk may be added directly to the package so that the cereal can be eaten directly from the package. If it is intended to add the water directly to the package to prepare the cereal to be eaten, the package should be lined with a liquid impervious material, such as wax, waxed paper, etc.

While a particular method of coating the cereal has been described herein, it is to be understood that other processes may be utilized to coat the pieces of cereal with dry powdered milk or milk substitute. A finely powdered dry milk or milk substitute is desired, having the consistency of flour, for better adherence to the cereal pieces, although more granular consistencies, or even small pellets, may be used on some cereals, such as shredded wheat, for example, and adequate coating of the cereal still obtained. In these instances it is probably more accurate to describe the milk product as imbedded in the interstices of the structure of the cereal pieces, but this is intended to be covered by the term "coating" or "coated" as used herein.

The following examples are illustrative of milk-coated cereals produced in accordance with the invention.

EXAMPLE 1

Ninety (90) grams of commercially available pre-sweetened cereal flakes, Honey Frosted Wheaties®, by General Mills, Minneapolis, Minn., were lightly sprayed with water to dampen them, and then dusted with sixteen (16) grams of Milkman® powdered milk, by Familiar Foods, Inc., processed to a flour-like consistency, until the flakes became uniformly coated with the powdered milk. The flakes were then dried and placed in a bowl and water was added, resulting in reconstitution of the milk and producing an excellent product that exhibited an appearance and flavor comparable to that of a flaked cereal, uncoated, placed in a bowl and liquid milk added.

EXAMPLE 2

Ninety (90) grams of commercially available toasted oat cereal sold under the name Cheerios®, by General Mills, Minneapolis, Minn., was lightly sprayed with water to dampen it, and then dusted with sixteen (16) grams of Milkman® dry powdered milk, by Familiar Foods, Inc., processed as in Example 1, until the pieces of cereal became uniformly coated with the powdered milk. The pieces of cereal were then dried, placed in a bowl and water added to reconstitute the milk. An excellent product resulted, with a taste and appearance comparable to that of an uncoated cereal placed in a bowl with liquid milk.

EXAMPLE 3

In this example, one hundred fifty (150) grams of commercially available bite-size shredded wheat was sprayed with water to dampen it, and then dusted with ten (10) grams of Milkman® dry powdered milk, in its commercially available consistency, and gently tumbled until the pieces of cereal were substantially uniformly coated with the powdered milk. The pieces of cereal were then dried, placed in a bowl and water added to reconstitute the milk. The resultant product was comparable to that obtained by adding liquid milk to uncoated shredded wheat.

EXAMPLE 4

In this example, fifteen and eight-tenths (15.8) grams of Cocoa Puffs® were lightly sprayed with water to dampen them and then dusted with five and eight-tenths (5.8) grams of Milkman® dry powdered milk, processed as in Example 1, and gently tumbled until the pieces of cereal were substantially uniformly coated with the powdered milk. The pieces of cereal were then dried, placed in a bowl and water added to reconstitute the milk. The resultant product was excellent.

Good adhesion of the dried milk product to the cereal pieces perhaps may be due at least in part to partial dissolving of the dried milk and consequent bonding of it to the dampened cereal pieces.

Although specific examples have been given above, the dried milk and milk substitute products may comprise any commercially available product, including casein proteins of milk, i.e., non-fat dry milk, caseinates, caseins, milk protein concentrates and milk protein isolates.

Caseinates and milk protein concentrates, in particular, enable the cereal to be calcium-fortified because they make insoluble calcium dispersable and suspendable. Depending upon requirements, calcium levels of these ingredients can range between 2.7% to 15.0% of total weight to provide 100% of the RDI in some food systems.

A high-calcium fractionated whey can also provide a source of calcium-fortification. This source of calcium provides the highest relative bioavailability in rats, as compared with three other common calcium sources. Whey protein concentrates are a particularly good source because of their high solubility over a wide pH range and their high protein content.

A milk-coated cereal in accordance with the invention may be conventionally packaged, and does not require storage or handling any different than that of an uncoated cereal.

While particular embodiments of the invention have been illustrated and described in detail herein, it should be understood that various changes and modifications may be made to the invention without departing from the spirit and intent of the invention, as defined by the scope of the appended claims.

What is claimed is:

1. A ready-to-eat cereal product comprising:

pieces of cereal having a non-tacky surface; and a coating of dry powdered milk or milk substitute product dusted onto the surface of the cereal pieces, said coating having a flour consistency and being reconstitutable in hot or cold water to produce a cereal having flavor, appearance and nutritional value comparable to an equivalent cereal that is not coated with the dried milk or milk substitute product but to which liquid milk has been added, said flour consistency of the coating enabling it to adhere to the cereal pieces without requiring the use of a tacky coating or carrier, and said dusted-on surface coating enabling said coating to quickly dissolve when exposed to water, prior to said cereal pieces becoming soggy.

2. A coated cereal product as claimed in claim 1, wherein:

the cereal pieces are coated with a dried whole milk product.

3. A coated cereal product as claimed in claim 2, wherein:

the ratio of dried whole milk to cereal is between 6% and 32%, by weight.

4. A coated cereal product as claimed in claim 1, wherein:

the cereal pieces are coated with a dried low fat milk product.

5. A coated cereal product as claimed in claim 4, wherein:

the ratio of dried low fat milk to cereal is between 6% and 32%, by weight.

6. A coated cereal product as claimed in claim 1, wherein:

the cereal pieces are coated with a dried non-fat milk product.

7. A coated cereal product as claimed in claim 1, wherein:

the cereal pieces are coated with a mixture of non-fat milk product and a milk substitute product.

8. A coated cereal product as claimed in claim 7, wherein:

the ratio of milk substitute to dried non-fat milk is in the range of from 15% to 25%.

9. A coated cereal product as claimed in claim 7, wherein:

the milk substitute product is selected from the group consisting of whey and soy.

10. A coated cereal product as claimed in claim 1, wherein:

the cereal pieces are coated with a dried milk substitute product.

11. A coated cereal product as claimed in claim 10, wherein:

the ratio of dried milk substitute to cereal is between 4% and 27%, by weight.

12. A coated cereal product as claimed in claim 1, wherein:

the ratio of dried milk or milk substitute product to cereal is between 6% and 32%, by weight.

13. A coated cereal product as claimed in claim 1, wherein:

nutrients are mixed with the dried milk or milk substitute for application to the cereal pieces along with the dried milk or milk substitute.

14. A process for preparing a ready-to-eat cereal comprising:

preparing a dry powdered milk or milk substitute product having a flour-like consistency;

dusting a coating of the dry powdered milk or milk substitute product onto the surface of pieces of the cereal to yield a coated cereal product to which water may be added to reconstitute the milk or milk substitute, thereby obtaining flavor, appearance and nutrition comparable to that of an equivalent cereal that is not coated with dried milk or milk substitute and to which liquid milk has been added, said flour-like consistency of the coating enabling it to stick to the cereal pieces without requiring the use of a tacky coating or carrier, and said dusted-on surface coating enabling said coating to quickly dissolve when exposed to water, prior to said cereal pieces becoming soggy.

15. A process as claimed in claim 14, wherein:

nutrients are mixed with the dried milk or milk substitute, whereby the dried milk or milk substitute serves as a carrier for the nutrients.

* * * * *